(12) United States Patent
Sathyanath (10) Patent No.: US 9,742,635 B2
(45) Date of Patent: Aug. 22, 2017

(54) MOBILE CLIENT-DRIVEN NETWORK TRANSITIONS

(71) Applicant: Alcatel-Lucent USA Inc., Murray Hill, NJ (US)

(72) Inventor: Ajay Sathyanath, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 404 days.

(21) Appl. No.: 14/276,512

(22) Filed: May 13, 2014

(65) Prior Publication Data
US 2015/0333975 A1    Nov. 19, 2015

(51) Int. Cl.
| | | |
|---|---|---|
| G06F 15/16 | (2006.01) | |
| H04L 12/24 | (2006.01) | |
| H04L 29/06 | (2006.01) | |
| H04W 8/08 | (2009.01) | |
| H04W 12/06 | (2009.01) | |

(52) U.S. Cl.
CPC ...... H04L 41/5022 (2013.01); H04L 41/5003 (2013.01); H04L 41/5019 (2013.01); H04L 63/08 (2013.01); H04L 67/42 (2013.01); H04W 8/08 (2013.01); H04W 12/06 (2013.01)

(58) Field of Classification Search
CPC . H04W 48/18; H04W 36/14; H04W 28/0247; H04W 36/18; H04W 72/08; H04W 36/08; H04W 52/0245; H04W 72/085; H04L 47/805
See application file for complete search history.

(56) References Cited

U.S. PATENT DOCUMENTS

| | | | | |
|---|---|---|---|---|
| 2006/0025151 A1* | 2/2006 | Karaoguz | ......... | H04L 29/06027 455/455 |
| 2012/0158949 A1* | 6/2012 | Lee | ..................... | H04L 41/0893 709/224 |
| 2012/0230305 A1* | 9/2012 | Barbu | ................... | H04W 48/20 370/338 |
| 2013/0136036 A1* | 5/2013 | Chen | ..................... | H04W 28/24 370/260 |
| 2014/0315536 A1* | 10/2014 | Chow | .................... | H04W 8/18 455/419 |

* cited by examiner

*Primary Examiner* — Arvin Eskandarnia
*Assistant Examiner* — Kamran Mohammadi
(74) *Attorney, Agent, or Firm* — Chiesa Shahinian & Giantomasi, PC (57) ABSTRACT

Methods and apparatuses for implementing a mobile client network transition are provided. In an embodiment, a network transition priority list including measured quality-of-service data for each of a plurality of networks within communications range of a mobile client is received. Each of the plurality of networks is ranked in accordance with one or more network administrator policies. An updated network transition priority list is generated based on the ranking of the plurality of networks, and the updated network transition priority list is transmitted to the mobile client.

17 Claims, 5 Drawing Sheets

MOBILE CLIENT-DRIVEN NETWORK TRANSITIONS

TECHNICAL FIELD

The present disclosure is generally directed to mobile communication networks, and more specifically to mobile communication transitions between network access points.

BACKGROUND

In the context of communications networks, quality-of-service (QoS) is used as a performance metric to generally describe a network's ability to prioritize applications, users or data flows, or to guarantee a certain level of performance to a data flow. For example, a required bit rate, delay, jitter, packet-dropping probability, bit error rate or other network performance metric may be guaranteed based on a network's QoS standards. From the perspective of a mobile client such as a smart-phone or a tablet, it is generally desirable to determine a network's quality-of-service standards beforehand to minimize network transition time, such as time spent having to pair or connect to a new network.

From a network administrator's perspective, however, it is often desirable to regulate, control or even deny a mobile client's ability to pair or connect to a network based on timing, available bandwidth or various other administrative policy reasons. For example, an enterprise may provide a network service wherein its employees can automatically transition to the enterprise network when they are within communication range (e.g., within the enterprise headquarters). The enterprise may also wish to offer faster and managed connectivity to other users located within communication range who would like to transition to the network merely for the increased QoS that they might experience. As such, the enterprise (and other similar network service providers) may be required to take an approach to network administrative policy that ensures the network's QoS to both its personnel and to others.

One challenge of mobile communication networks, however, is that a network transition initiated by the network provider cannot be QoS-sensitive because the QoS of a wireless medium such as a mobile client depends on location, signal strength, a number of other active clients and other variables that may not be determinable from the network provider side. On the other hand, a client-initiated approach to network transitions must still address the issue of enforcing network administrative policy controls (whether or not QoS-sensitivity is achieved). While QoS-sensitive network transitions are generally more desirable, it would be advantageous to employ a network transition solution that also adheres to network administrative policy controls so that improved determinations of whether to transition between networks can be made.

SUMMARY

Methods and apparatuses for implementing power-efficient, QoS-sensitive and network administrative policy-controlled mobile client network transitions are provided. The embodiments describe a method for adhering to network administrative policy controls and other regulations during a mobile client-initiated network transition. The QoS-sensitive network transitions based on the method disclosed herein require a mobile client to expend only minimal power relative to known techniques, and the method can be performed even when selected mobile client network interfaces (e.g., Wi-Fi, Bluetooth and cellular interfaces) are disabled.

In accordance with an embodiment, a network transition priority list including measured quality-of-service data for each of a plurality of networks within communications range of a mobile client is received. Each of the plurality of networks is ranked in accordance with one or more network administrative policies. An updated network transition priority list is generated based on the ranking of the plurality of networks, and the updated network transition priority list is transmitted to the mobile client. The measured quality-of-service data from the plurality of networks may be compared to a time-stamp indication to determine whether the measured quality-of-service data is current.

In accordance with an embodiment, additional data may be received from the mobile client including one or more of a current location, a list of currently running applications, a list of currently running applications requiring network access, a list of currently running applications requiring a network transition, a current network connection and quality-of-service data for a current network connection. The updated network transition priority list may be generated based on the additional data from the mobile client.

In accordance with an embodiment, authentication information relating to one or more networks included on the updated network transition priority list may be transmitted to the mobile client.

In accordance with an embodiment, the updated network transition priority list may be arranged into priority groups of networks based on the one or more network administrative policies, and networks within the priority groups may be arranged in descending order based on the measured quality-of-service data.

In accordance with an embodiment, a quality-of-service threshold value for the updated network transition priority list may be determined, and one or more networks may be excluded from the updated network transition priority list based on the quality-of-service threshold value.

These and other advantages of the invention will be apparent to those of ordinary skill in the art by reference to the following detailed description and the accompanying drawings.

DETAILED DESCRIPTION

Figure 1:
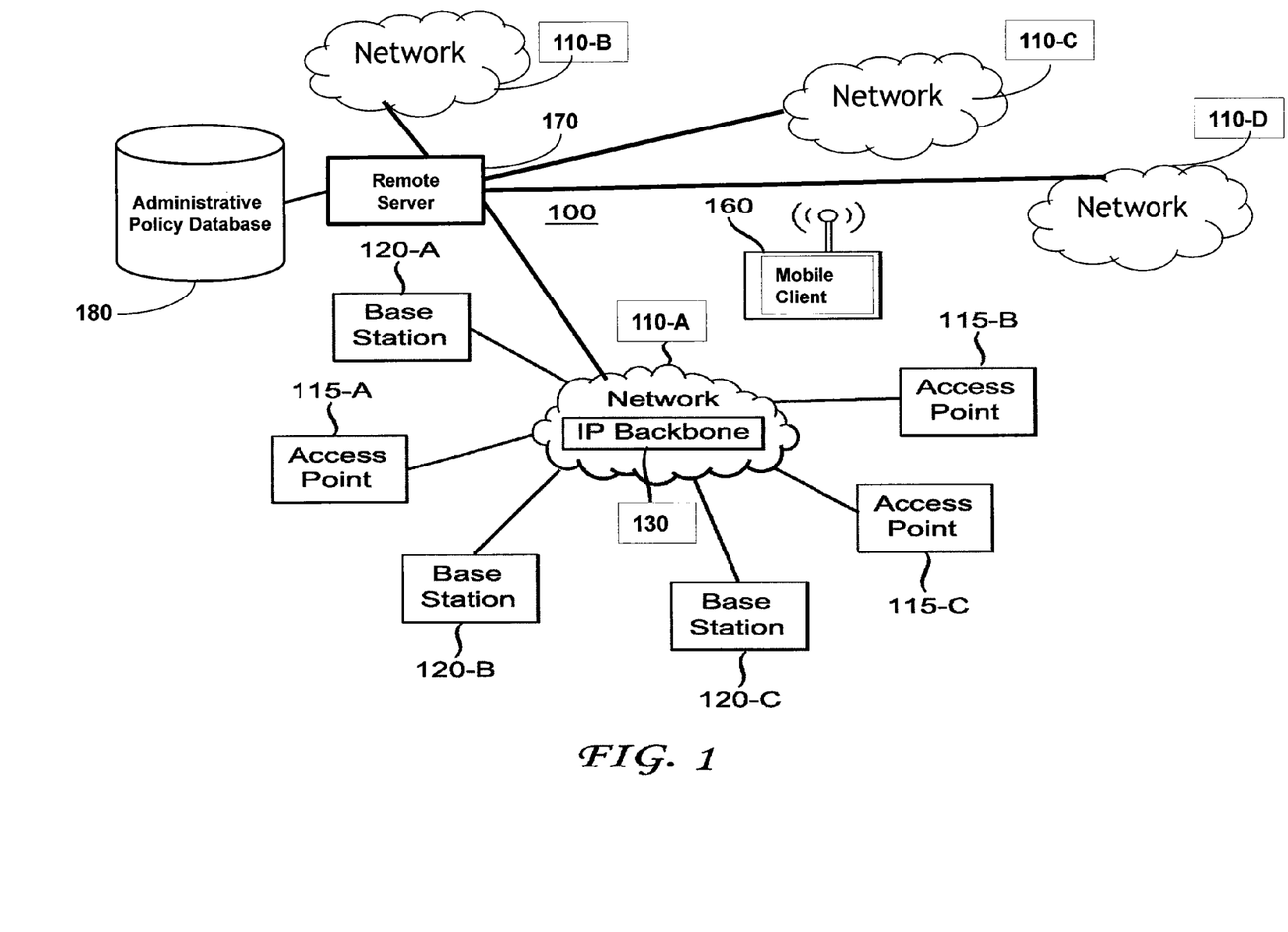
FIG. 1 is a schematic diagram of communication system suitable for implementing the various embodiments.

FIG. 1 is a schematic diagram of communication system suitable for implementing the various embodiments. Communication system 100 comprises a plurality of networks 110-A, 110-B, 110-C, 110-D wherein each network, such as network 110-A, includes a plurality of access points 115-A, 115-B, 115-C and a plurality of base stations 120-A, 120-B, 120-C. A mobile client such as mobile client 160 may use communication system 100 to achieve wireless connectivity in order to conduct communications with another device (not shown). As such, a network transition as referred to herein includes communication transitions by a mobile client such as mobile client 160 from a first network connection, such as with network 110-A (i.e., via a network 110-A access point 115 or a base station 120) to a second network connection, such as with network 110-B, i.e., via a network 110-B access point 115 or a base station 120 (not shown).

In an embodiment, a network such as network 110-A comprises an Internet Protocol (IP) backbone 130 through which data is transmitted. Network 110-A may be connected to other networks. Network 110-A may be the Internet. In other embodiments, network 110-A may comprise one or more of a number of different types of networks, such as, for example, an intranet (e.g., an enterprise network), a local area network (LAN), a wide area network (WAN), a wireless network, a Fibre Channel-based storage area network (SAN), or Ethernet. Other networks may be used. Alternatively, network 110-A may comprise a combination of different types of networks.

In an embodiment, each access point 115 provides a wireless local area network (WLAN) in a local area in the vicinity of the access point, e.g., in compliance with Wi-Fi protocol. The WLANs of two access points 115 may overlap. Accordingly, an access point 115 may provide wireless connectivity to mobile client 160 in accordance with Wi-Fi protocol. One skilled in the art will note that access points as described in relation to FIG. 1 and the use of Wi-Fi protocols are generally known.

Base stations 120 may provide to mobile client 160 wireless connectivity for cellular communications according to any one of a variety of protocols, such as code division multiple access (CDMA, CDMA200) protocol, wideband-CDMA (WCDMA) protocol, Universal Mobile Telecommunications System (UMTS) protocol and Global System for Mobile Telecommunications (GSM) protocol. Other protocols for cellular communications may be used. For example, other 3G, 4G or Long-Term Evolution (LTE) protocols may be used. One skilled in the art will note that base stations as described in relation to FIG. 1 and the use of cellular communications protocols are also generally known.

Mobile client 160 may be any device that enables a user to communicate wirelessly via a network. One skilled in the art will note that the design and operation of mobile clients such as mobile client 160 is well known in the art and that various modifications are possible. For example, mobile client 160 may be a wireless communication device such as a smart-phone, tablet or personal digital assistant. Alternatively, mobile client 160 may be a personal computer, laptop computer, workstation or mainframe computer with a capability to connect to a network via wireless communication methods. Therefore, mobile client 160 need not be representative of a device in-transit for the purposes of the embodiments herein.

Mobile client 160 may comprise a variety of functional components (not shown) including a transceiver for sending and receiving signals via an antenna, a processor for executing computer program instructions which are stored in a memory (e.g., random access memory (RAM), read only memory (ROM), one or more disk drives, magnetic disk, CD ROM, or another computer readable medium), input/output devices and a display for presenting images, text, Web pages, and other information to a user.

In an embodiment, communication system 100 includes a remote server such as remote server 170, which is operable to be in communication with one or more networks 110 and mobile client 160 to implement a network transition. For example, remote server 170 may comprise a variety of functional components (not shown) such as a transceiver for sending and receiving signals via an antenna to one or more networks 110 and mobile client 160. Remote server 170 may also include a processor, which operates by executing computer program instructions, either stored in memory or loaded into memory via access to administrative policy database 180, when execution of the computer program instructions is desired. These computer program instructions define the overall operation of remote server 170. For example, the process of FIG. 3 below can be defined by computer program instructions stored in a memory and controlled by a processor of remote server 170 executing the computer program instructions. The computer program instructions can be implemented as computer executable code programmed by one skilled in the art to perform an algorithm defined by the process as outlined in FIG. 3. Accordingly, by executing the computer program instructions, a processor of remote server 170 may execute an algorithm defined by the method of FIG. 3.

Mobile client 160 may identify one or more networks (i.e., access points 115 or base stations 120) within communication system 100 and measure QoS data associated with each network. For example, mobile client 160 may comprise multiple interfaces, including cellular, Wi-Fi (IEEE 802.11) and Bluetooth wireless interfaces. In an embodiment, mobile client 160 may be able to obtain QoS data regarding a network from packets in a wireless medium without having to pair to the particular network.

A measured QoS for a network can form the basis of a seamless, automatic, and QoS-aware network transition. As described in greater detail below, mobile client 160 may measure QoS data to generate a network transition priority list of networks that may be transmitted to, and received by, remote server 170. Remote server 170 may then access network administrative policy database 180 to re-order the list based on one or more network policies, i.e., to generate an updated network transition priority list. In some embodiments, remote server 170 may further configure the updated network transition priority list based on additional variables, including additional data received from mobile client 160. Remote server 170 may then transmit the updated network transition priority list back to mobile client 160 for use in implementing a network transition.

In an embodiment, mobile client 160 measures QoS data (e.g., numerical QoS values) relating to various networks within communications range of its location. Mobile client 160 then ranks the various networks based on the measured QoS data to generate a network transition priority list. Mobile client 160 also may determine or monitor additional information, including location information, current application status (e.g., applications that are running, or that require network access), a current network connection (if any), the QoS of a current network, and a list of applications that require a network transition.

Mobile client 160 then sends the network transition priority list and any additional data to remote server 170, e.g., via a secure connection. In an embodiment, remote server 170 may be an enterprise server that is operable to authenticate various security credentials of mobile client 160 prior to receiving and re-ordering the network transition priority list in a manner consistent with one or more network policies. For example, network policies may include restricting certain network access points from being accessed by mobile client 160, or temporarily cordoning off network access points, e.g., for participation in some other critical function.

After re-ordering the network transition priority list in accordance with network policies, remote server 170 then generates an updated network transition priority list (also referred to herein as an updated list) and transmits the updated list, along with authentication information for each of the networks on the updated list (if necessary), to mobile client 160. In an embodiment, remote server 170 may re-order the updated network transition priority list such that a plurality of networks are listed in priority groups in descending order of priority, and within each priority group the networks may be listed in descending order based on QoS data. In another embodiment, remote server 170 may transmit a QoS-threshold value, e.g., a minimum QoS-threshold, to mobile client 160. For example, a QoS-threshold value may range from 0 to −1*the highest measured QoS value.

Upon receipt of the updated list, mobile client 160 may calculate a differential or QoS-gain for each network on the updated list. The differential or QoS-gain for a network is a numerical relation between a QoS value of a potential network connection and a QoS value for a current network connection. For example, the differential or QoS-gain may be a difference between a QoS value for a current network connection and the QoS values listed for networks on the updated list. In an embodiment, Mobile client 160 may remove from the updated list all networks having a QoS-gain less than a QoS-threshold.

Mobile client 160 may then attempt a network connection based on the updated network transition priority list. In an embodiment, mobile client 160 may attempt network connections in descending order based on the updated list, e.g., first attempting to connect with the highest QoS network in the highest priority group and, if that attempt is unsuccessful, attempting to connect with the next highest QoS network in the same priority group, and so on. If mobile client 160 is unable to connect to any of the networks in the highest priority group, it may then attempt to connect with the highest QoS network in the next highest priority group. Mobile client 160 may continue to attempt to connect to networks based on the priority group hierarchy (and based on the hierarchy of networks within each priority group) until it successfully connects to an network, or exceeds a temporal threshold (i.e., times out), having failed to connect to any network.

As described above, a network transition priority list may include measured quality-of-service data for each of a plurality of networks within communications range of a mobile client. For example, a network transition priority list received by remote server 170 may include QoS data in the following format:
access point=A, QoS=8
access point=U, QoS=7
access point=X, QoS=5
access point=C, QoS=3
access point=B, QoS=2
location=xxx, current application list=xxxxx, for-application-list=all,
current-network=xxxx, current-QoS=4.

For example, the network transition priority list above includes measured quality-of-service data for each network access point within range of mobile client 160 (e.g., access points A, U, X, C and B). In an embodiment, the list also includes additional information from the mobile client such as: a current location (location=xxx), a list of currently running applications (current application list=xxxxx), a list of currently running applications requiring network access (for-application-list=all), a list of currently running applications requiring a network transition, a current network connection (current-network=xxxx) and quality-of-service data for a current network connection (current-QoS=4).

Remote server 170, e.g., upon consulting administrative policy database 180, may then transmit an updated network transition priority list to mobile client 160 in the following format:
access point=U, QoS=7, auth-token=token U, priority=1
access point=B, QoS=2, auth-token=tokenB, priority=1
access point=X, QoS=5, auth-token=tokenX, priority=2
access point=C, QoS=3, auth-token=tokenC, priority=2
QoS-threshold=1

For example, in the updated network transition priority list above remote server 170 has removed access-point A, e.g., based on a network administrative policy. Further, remote server 170 also may determine a QoS-threshold (e.g., QoS-threshold=1) for the updated network transition priority list. For example, since the QoS for the mobile client's current network connection is 4 (current-QoS=4), for a determined QoS-threshold=1 the mobile client may remove the entry corresponding to access-point C, which has a QoS of only 3 (3−4=−1 which is not greater than QoS-threshold=1). Hence the updated network transition priority list may be further pruned to exclude access-point C as follows:
access point=U, QoS=7, auth-token=token U, priority=1
access point=B, QoS=2, auth-token=tokenB, priority=1
access point=X, QoS=5, auth-token=tokenX, priority=2

Continuing with the example above, if remote server 170 determines a QoS-threshold of −10 (QoS-threshold=−10), then the mobile client would not be able to remove any of the entries in the updated network transition priority list (i.e., the mobile client must implement a network transition). As such, remote server 170 may effectively force a network transition to occur in-line with network administrative priorities. Alternatively, mobile client 160 may be configured to disregard the condition that the QoS-gain or differential must be greater than the QoS-threshold, thereby overriding network administrative priorities.

Figure 2:
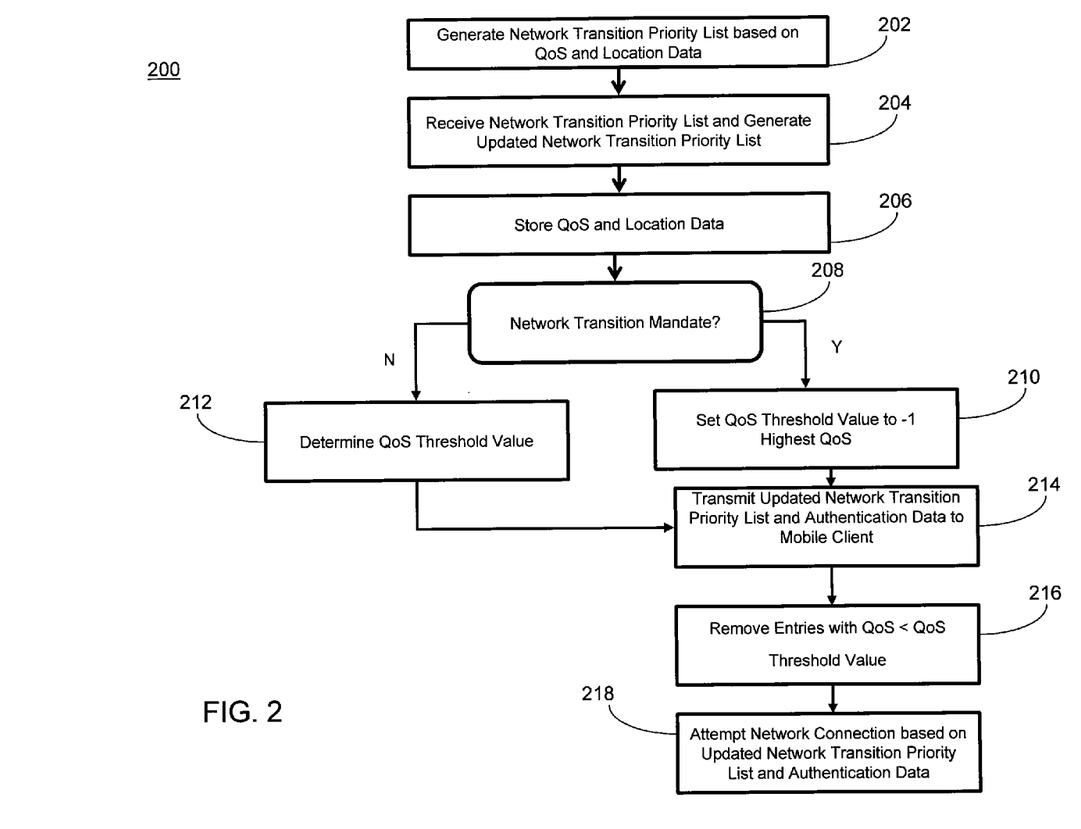
FIG. 2 illustrates a flowchart diagram for implementing a mobile client network transition in accordance with an embodiment.

FIG. 2 illustrates a flowchart diagram for implementing a client-driven network transition in accordance with an embodiment. Using the components of communication system 100 as an example, at 202, mobile client 160 generates a network transition priority list based on QoS and location data. At 204, the network transition priority list is received at remote server 170, which may execute the steps of FIG. 3 below to generate an updated network transition priority list. At 206, remote server 170 may store the QoS and location data received from mobile client 160 (e.g., in memory) for future reference. If remote server 170 determines a network transition mandate at 208 (e.g., based on network policies), a QoS threshold value is set to −1*the highest QoS value on the updated network transition priority list, i.e., a value sufficient for enforcing that a network transition must occur at 210. If remote server 170 does not determine a network transition mandate at 208, remote server 170 may instead determine a QoS threshold value at 212 and transmit an updated network transition priority list and authentication data for network access to mobile client 160 at 214. At 216, mobile client 160 removes entries with QoS<the QoS threshold value from the updated network transition priority list. Alternatively, remote server 170 may remove entries with QoS<the QoS threshold value prior to transmitting the updated network transition priority list to mobile client 160. At 218, mobile client 160 initiates attempts to transition from a current network connection to a new network connection based on the updated network transition priority list and authentication data.

Figure 3:
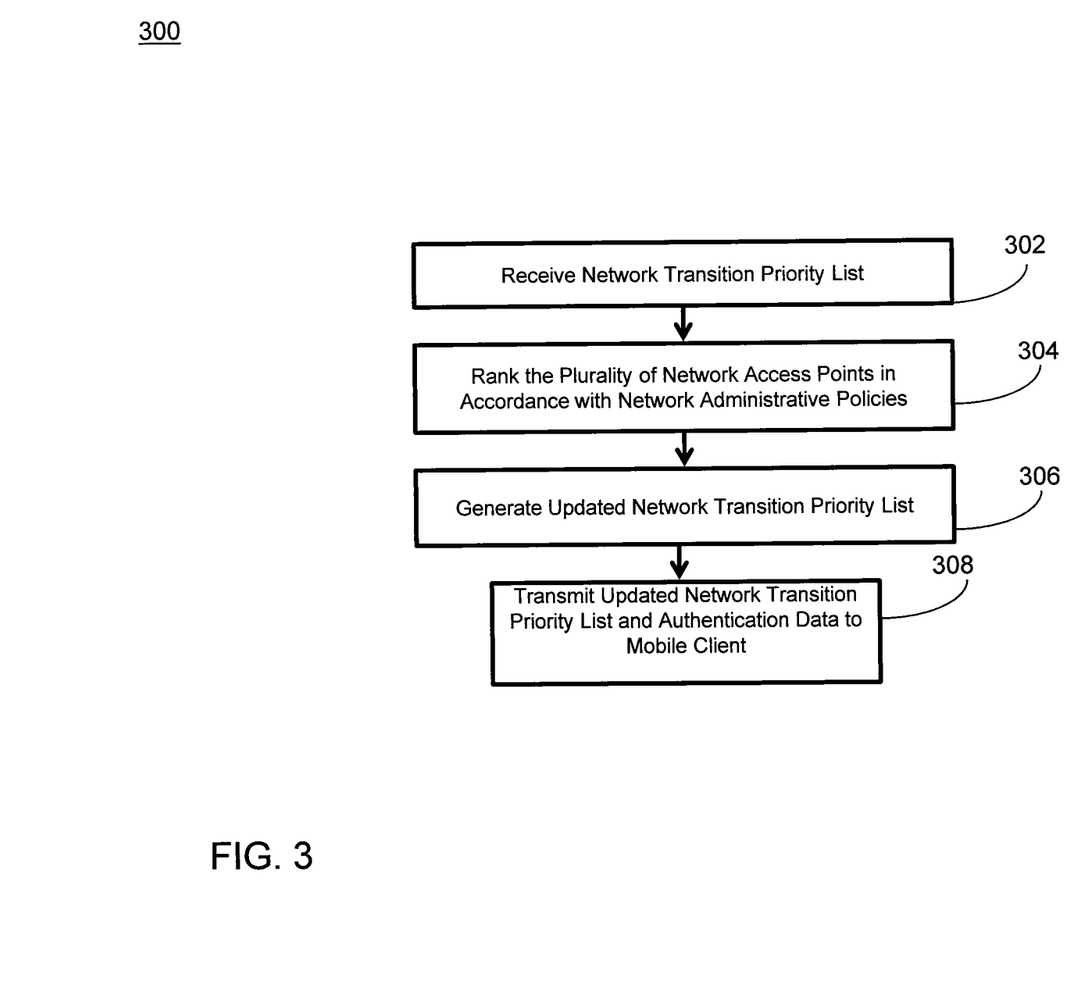
FIG. 3 illustrates a flowchart diagram for implementing a mobile client network transition in accordance with an embodiment.

FIG. 3 illustrates a flowchart diagram for implementing a mobile client network transition in accordance with an embodiment. For context in relation to FIG. 2 above, the flowchart diagram of FIG. 3 further describes the remote server process at 204. As such, at 302 remote server 170 receives a network transition priority list including measured QoS data for each of a plurality of networks within communications range of a mobile client, such as mobile client 160. In one embodiment, remote server 170 may compare the measured QoS data related to the plurality of networks on the network transition priority list to a time-stamp indication to determine whether the measured QoS data is current. For example, QoS data measured outside of a temporal threshold may be discarded, or given lower priority, based on network administrative polices.

In addition to QoS data, additional useful data may be received at remote server 170 for determining an updated network transition priority list. For example, mobile client 160 may provide a current location, a list of currently running applications, a list of currently running applications requiring network access, a list of currently running applications requiring a network transition, a current network connection and QoS data regarding a current network connection in addition to measured QoS data from nearby network connections.

At 304, remote server 170 ranks the plurality of networks on the network transition priority list in accordance with one or more network administrative policies. For example, the networks may be ranked based on network policies that may include restricting certain network access points from being accessed by mobile client 160, or temporarily cordoning off network access points, e.g., for participation in some other critical function. At 306, remote server 170 generates an updated network transition priority list based on the ranking of the plurality of networks. As described above, the updated network transition priority list may be generated based in part on the additional data from mobile client 160.

Remote server 170 transmits the updated network transition priority list to mobile client 160 at 308. In some instances, authentication information relating to one or more networks included on the updated network transition priority list may be transmitted to the mobile client. In accordance with an embodiment, the updated network transition priority list may be arranged into priority groups of networks based on the one or more network administrative policies. For example, networks within the priority groups may be arranged in descending order based on the measured QoS data. In accordance with another embodiment, a QoS-threshold value for the updated network transition priority list may be determined, and one or more networks may be excluded from the updated network transition priority list based on the QoS-threshold value.

Alternatively, in order to initiate automatic transitions, a trigger to implement the process of FIG. 3 may be based on a location of mobile client 160. For example, the process may be triggered based on mobile client 160 being located within a geo-fence (e.g., within a defined geographical region of a network). As such, mobile client 160 may not be required to have its networking interfaces active all the time. Rather, it may only be necessary for mobile client 160 to have only one active networking interface (e.g., for communication with another device), or even no active networking interfaces at a given time. When a location is sensed and a trigger is set (e.g., by remote server 170), the network interfaces may be activated and mobile client 160 may measure QoS data using the required networking interfaces. For example, smart-phone users typically disable their Wi-Fi interfaces to conserve battery life. Under such conditions, when the location of the smart-phone (i.e., mobile client) meets determined criteria for initiating a network transition process (such as described in FIG. 3), the Wi-Fi interface may be activated and QoS data may be measured on all active networking interfaces (e.g., cellular, Wi-Fi, etc.), such as described above.

It also may be known to remote server 170 that mobile client 160 is connected to a best possible network interface, e.g., a current cellular interface. In such case, the activation of another interface (e.g., a Wi-Fi interface) to measure QoS data (for Wi-Fi network access points) would needlessly drain battery power and not have any bearing on a network transition. As such, mobile client 160 may instead access a cache memory entry (e.g., via remote server 170) for an inactive network interface and QoS data corresponding to its current location via a networking interface that is already active. In an embodiment, if a time-stamp indicator associated with the cached data is outside of a temporal threshold, mobile client 160 may activate an associated inactive interface (e.g., the Wi-Fi interface) to refresh the QoS data.

Figure 4:
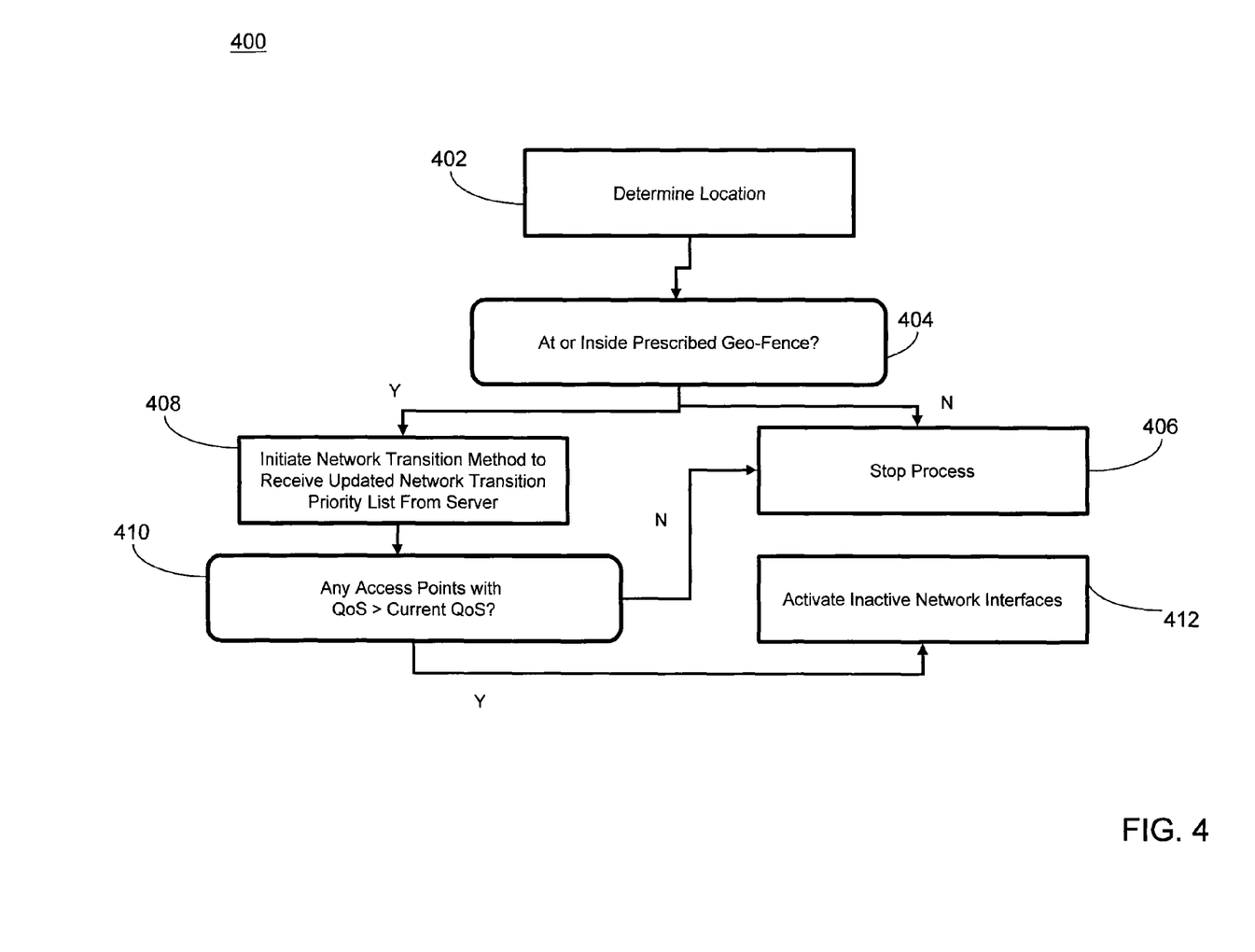
FIG. 4 illustrates a flowchart diagram for implementing a mobile client network transition in accordance with an embodiment.

FIG. 4 illustrates a flowchart diagram for implementing a mobile client network transition in accordance with an embodiment. Continuing to use the components of communication system 100 as an example, at 402 remote server 170 determines the location of mobile client 160, e.g., via information stored in memory or by accessing a known current network for mobile client 160. If mobile client 160 is not at or inside a prescribed geo-fence (e.g., within a prescribed coverage area of an enterprise network) at 404, remote server 170 stops the process at 406. However, if mobile client 160 is determined to be at or inside a prescribed geo-fence at 404, a network transition method to receive an updated network transition priority list from remote server 170 (as described above in FIG. 3) may be by mobile client 160 at 408. If at 410 mobile client 160 determines that the updated network transition priority list includes networks wherein QoS>Current QoS, mobile client 160 activates its inactive network interfaces (e.g., a cellular or Wi-Fi network interface) to attempt a connection to a higher QoS network at 412. Otherwise, if at 410 mobile client 160 determines that the updated network transition priority list does not include networks with QoS>current QoS, the process is stopped at 406.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 2-4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
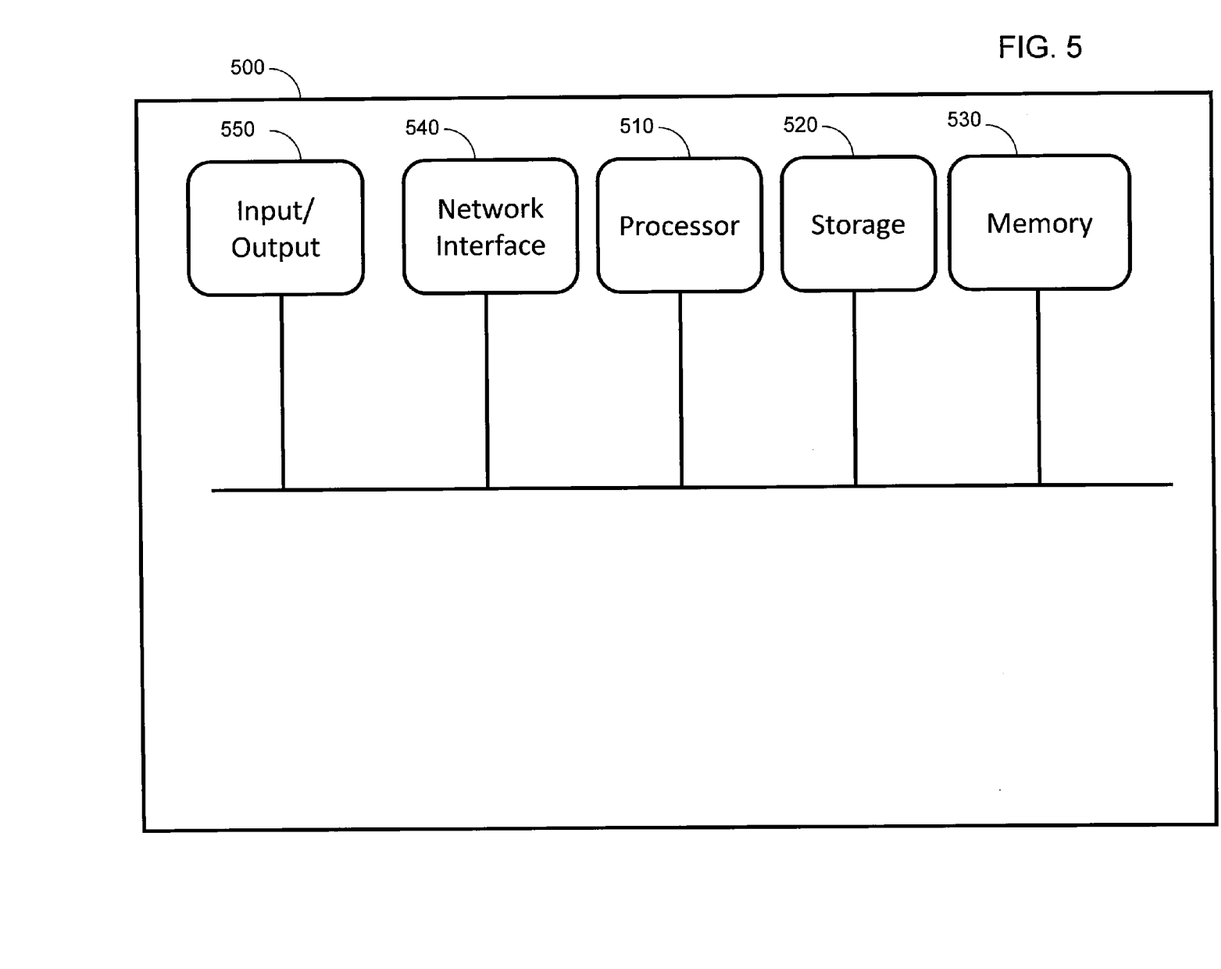
FIG. 5 is a high-level block diagram of an exemplary computer that may be used for implementing a mobile client network transition.

A high-level block diagram of an exemplary computer that may be used to implement systems, apparatus and methods described herein is illustrated in FIG. 5. Computer 500 comprises a processor 510 operatively coupled to a data storage device 520 and a memory 530. Processor 510 controls the overall operation of computer 500 by executing computer program instructions that define such operations. The computer program instructions may be stored in data storage device 520, or other computer readable medium, and loaded into memory 530 when execution of the computer program instructions is desired. Referring to FIG. 1, for example, mobile client 160 or remote server 170 may comprise one or more components of computer 500. Thus, the method steps of FIGS. 2-4 can be defined by the computer program instructions stored in memory 530 and/or data storage device 520 and controlled by processor 510 executing the computer program instructions. For example, the computer program instructions can be implemented as computer executable code programmed by one skilled in the art to perform an algorithm defined by the method steps of FIGS. 2-4. Accordingly, by executing the computer program instructions, processor 510 executes an algorithm defined by the method steps of FIGS. 2-4. Computer 500 also includes one or more network interfaces 540 for communicating with other devices via a network, such as network 110. Computer 500 also includes one or more input/output devices 550 that enable user interaction with computer 500 (e.g., display, keyboard, mouse, speakers, buttons, etc.).

Processor 510 may include both general and special purpose microprocessors, and may be the sole processor or one of multiple processors of computer 500. Processor 510 may comprise one or more central processing units (CPUs), for example. Processor 510, data storage device 520, and/or memory 530 may include, be supplemented by, or incorporated in, one or more application-specific integrated circuits (ASICs) and/or one or more field programmable gate arrays (FPGAs).

Data storage device 520 and memory 530 each comprise a tangible non-transitory computer readable storage medium. Data storage device 520, and memory 530, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 550 may include peripherals, such as a printer, scanner, display screen, etc. For example, input/output devices 550 may include a display device such as a cathode ray tube (CRT), plasma or liquid crystal display (LCD) monitor for displaying information to the user, a keyboard, and a pointing device such as a mouse or a trackball by which the user can provide input to computer 500.

Any or all of the systems and apparatus discussed herein, including mobile client 160 and remote server 170 may be implemented using a computer such as computer 500.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

I claim:

1. A method for implementing a mobile client network transition, the method comprising:
   receiving a network transition priority list including:
      measured quality-of-service data for each of a plurality of networks within communications range of a mobile client, and
      additional data including one or more of a current location, a list of currently running applications, a list of currently running applications requiring network access, a list of currently running applications requiring a network transition, a current network connection, and quality-of-service data for the current network connection;
   generating an updated network transition priority list based on a rank of each of the plurality of networks in the network transition priority list and the additional data;
   associating each of the plurality of networks in the updated network transition priority list with a priority group based on one or more network administrative policies;
   ranking the networks within each priority group based on their associated measured quality-of-service data;
   removing networks from the updated network transition priority list which do not satisfy a quality-of-service threshold; and
   transmitting the updated network transition priority list to the mobile client after the associating, the ranking, and the removing.

2. The method of claim 1, further comprising transmitting authentication information relating to one or more networks included on the updated network transition priority list to the mobile client.

3. The method of claim 1, further comprising comparing the measured quality-of-service data for each of the plurality of networks to a time-stamp indication to determine whether the measured quality-of-service data is current.

4. The method of claim 1, wherein associating each of the plurality of networks in the updated network transition priority list with a priority group comprises arranging the plurality of networks into priority groups based on the one or more network administrative policies.

5. The method of claim 1, wherein ranking the networks within each priority group comprises ordering the networks within each priority group in descending order based on the measured quality-of-service data.

6. An apparatus for implementing a mobile client network transition, the apparatus comprising:
a memory to store computer program instructions; and
a processor communicatively coupled to the memory, the processor configured to execute the computer program instructions, which, when executed on the processor, cause the processor to perform operations comprising:
receiving a network transition priority list including:
measured quality-of-service data for each of a plurality of networks within communications range of a mobile client, and
additional data including one or more of a current location, a list of currently running applications, a list of currently running applications requiring network access, a list of currently running applications requiring a network transition, a current network connection, and quality-of-service data for the current network connection;
generating an updated network transition priority list based on a rank of each of the plurality of networks in the network transition priority list and the additional data;
associating each of the plurality of networks in the updated network transition priority list with a priority group based on one or more network administrative policies;
ranking the networks within each priority group based on their associated measured quality-of-service data;
removing networks from the updated network transition priority list which do not satisfy a quality-of-service threshold; and
transmitting the updated network transition priority list to the mobile client after the associating, the ranking, and the removing.

7. The apparatus of claim 6, the operations further comprising transmitting authentication information relating to one or more networks included on the updated network transition priority list to the mobile client.

8. The apparatus of claim 6, the operations further comprising comparing the measured quality-of-service data from the plurality of networks to a time-stamp indication to determine whether the measured quality-of-service data is current.

9. The apparatus of claim 6, wherein associating each of the plurality of networks in the updated network transition priority list with a priority group comprises arranging the plurality of networks into priority groups based on the one or more network administrative policies.

10. The apparatus of claim 6, wherein ranking the networks within each priority group comprises ordering the networks within each priority group in descending order based on the measured quality-of-service data.

11. A non-transitory computer-readable medium storing computer program instructions for implementing a mobile client network transition, which, when executed on a processor, cause the processor to perform operations comprising:
receiving a network transition priority list including:
measured quality-of-service data for each of a plurality of networks within communications range of a mobile client, and
additional data including one or more of a current location, a list of currently running applications, a list of currently running applications requiring network access, a list of currently running applications requiring a network transition, a current network connection, and quality-of-service data for the current network connection;
generating an updated network transition priority list based on a rank of each of the plurality of networks in the network transition priority list and the additional data;
associating each of the plurality of networks in the updated network transition priority list with a priority group based on one or more network administrative policies;
ranking the networks within each priority group based on their associated measured quality-of-service data;
removing networks from the updated network transition priority list which do not satisfy a quality-of-service threshold; and
transmitting the updated network transition priority list to the mobile client after the associating, the ranking, and the removing.

12. The non-transitory computer-readable medium of claim 11, the operations further comprising comparing the measured quality-of-service data from the plurality of networks to a time-stamp indication to determine whether the measured quality-of-service data is current.

13. The non-transitory computer-readable medium of claim 11, wherein associating each of the plurality of networks in the updated network transition priority list with a priority group comprises arranging the plurality of networks into priority groups based on the one or more network administrative policies.

14. The non-transitory computer-readable medium of claim 11, wherein ranking the networks within each priority group comprises ordering the networks within each priority group in descending order based on the measured quality-of-service data.

15. The method of claim 1, wherein removing networks from the updated network transition priority list which do not satisfy a quality-of-service threshold comprises:
calculating a difference between the measured quality-of-service data for each of the plurality of networks and the quality-of-service data for the current network connection that the mobile client is connected to; and
removing the networks from the updated network transition priority list which do not satisfy the quality-of-service threshold based on the calculating.

16. The apparatus of claim 6, wherein removing networks from the updated network transition priority list which do not satisfy a quality-of-service threshold comprises:
calculating a difference between the measured quality-of-service data for each of the plurality of networks and the quality-of-service data for the current network connection that the mobile client is connected to; and
removing the networks from the updated network transition priority list which do not satisfy the quality-of-service threshold based on the calculating.

17. The non-transitory computer-readable medium of claim 11, wherein removing networks from the updated network transition priority list which do not satisfy a quality-of-service threshold comprises:
calculating a difference between the measured quality-of-service data for each of the plurality of networks and the quality-of-service data for the current network connection that the mobile client is connected to; and removing the networks from the updated network transition priority list which do not satisfy the quality-of-service threshold based on the calculating.

\* \* \* \* \*